United States Patent [19]

Griswold

[11] 3,846,378
[45] Nov. 5, 1974

[54] SYNCHRONOUS PROCESS FOR THERMALLY-CURABLE BLOCKED POLYURETHANES

[75] Inventor: Azel Alan Griswold, Greensboro, N.C.

[73] Assignee: Burlington Industries, Inc., Greensboro, N.C.

[22] Filed: Apr. 17, 1972

[21] Appl. No.: 244,921

[52] U.S. Cl............................ 260/77.5 TB, 8/115.6
[51] Int. Cl............................................. C08g 22/32
[58] Field of Search.............................. 260/77.5 TB

[56] References Cited
UNITED STATES PATENTS

| | | | |
|---|---|---|---|
| 3,252,848 | 5/1966 | Borsellino | 156/307 |
| 3,384,506 | 5/1968 | Elkin | 117/62 |
| 3,393,177 | 7/1968 | Guest et al. | 260/77.5 TB |
| 3,676,402 | 7/1972 | Matsui et al. | 260/75 NC |
| 3,694,389 | 9/1972 | Levy | 260/23 TN |

FOREIGN PATENTS OR APPLICATIONS 1,032,059    6/1966    Great Britain

Primary Examiner—H. S. Cockeram
Attorney, Agent, or Firm—Cushman, Darby & Cushman

[57] ABSTRACT

A rapid partial-blocking process for synthesizing complex polyurethanes. One or more polyols, a polyisocyanate, an amount of an oxime blocking agent chemically equivalent to not more than 35 percent of the isocyanate groups charged, and a catalyst are combined and optionally heated to form a storage-stable oxime-blocked intermediate polyurethane, free of active isocyanate groups. This polyurethane may be sold as such, or it may, after addition of more polyol if needed, be converted to bulk, film emulsion, or other form in preparation for final curing. Heating at curing temperature releases the blocking agent and forms a stable high molecular weight polyurethane. The products of the invention are particularly effective as intermediates and final compositions for use as adhesives, textile finishes, and coatings on a variety of substrates.

19 Claims, No Drawings

SYNCHRONOUS PROCESS FOR THERMALLY-CURABLE BLOCKED POLYURETHANES

BACKGROUND OF THE INVENTION

This invention relates to the synthesis of polyurethanes, particularly those syntheses including a blocking process.

The scope of the polyurethane technology developed in the past thirty years is enormous. Some idea of this scope may be gained by review of Volumes I and II of *Polyurethanes, Chemistry and Technology*, by J. H. Saunders and K. C. Frisch, Interscience Publishers, 1964. Techniques more or less specific to various fields of technology have been developed around general use and structural categories such as foams, elastomers, coatings, adhesives, fibers, and others. Three broad methods of synthesis are defined by Saunders and Frisch in the area of foam technology: prepolymer, semi- or quasi-prepolymer, and one-shot. The one-shot terminology is also used with elastomeric polyurethanes, but the most nearly analogous term in coating technology is "one-component." Both terms imply unitized or synchronous action or presence. A more generally inclusive term than one-shot or one-component having evidently not been recognized in urethane chemistry, the term "synchronous" has herein been used to distinguish this invention from its prepolymer counterpart. The latter is also referred to, in the context of this invention, as "sequential."

In U.S. Pat. No. 3,248,259 Borsellino and Samson describe a process for textile finishes wherein prepolymeric polyurethanes are reacted with a variety of blocking agents to form condensates blocked to varying degrees, preferably at or near 100 lpercent blocking. In U.S. Pat. No. 3,228,820 Samson makes foam adhesives using half- to wholly-blocked prepolymers, and in U.S. Pat. No. 3,491,051 Elkin and Hassall emulsify solutions of "at-least-partially blocked, curable urethane prepolymers." All of these patents, while recognizing some of the merits of partial blocking, use only urethane prepolymers as their starting points. Although highly useful in those areas where they are most effective, prepolymers are troublesome and time-consuming to prepare, and the relatively high molecular weights of their partially-blocked products inevitably impose a need for greater dilution by solvents than is required by the products of this invention.

SUMMARY OF THE INVENTION

This invention comprises a synchronous, as compared to the known prepolymer partial-blocking process for making an oxime-blocked intermediate polyurethane, such more easily made intermediate being converted on curing to a final polyurethane, different from that resulting from a prepolymer-based process. The process of the invention preferably comprises combining all of the ingredients — polyol or mixture of polyols, polyisocyanate, oxime blocking agent, and catalyst — at essentially the same time in a single reaction mixture, thereby achieving maximum simplicity of procedure and minimum time of reaction. Blocking is partial, and over a wide range of degree, from 5 to 35 percent. The invention affords greater latitude and flexibility of choice of working and intermediate viscosities than does the prepolymer method, in which method the high viscosity of the prepolymer itself is largely controlling.

The invention depends upon the concept of using a blocking agent — an oxime — so fast in its reaction with the polyisocyanate that it essentially effects a desirable stepwise series of reactions in a multi-reagent mixture. The oxime rapidly deactivates (until later curing) enough of the isocyanate groups that they cannot cause the viscosity to rise any higher than is desirable and planned. After completion of the isocyanate reactions and subsequent processing, such as application to a surface, fabric, or wire, the blocked intermediate polyurethane is cured to a stable and generally insoluble final polyurethane.

The products of the invention are useful in both their intermediate precondensate and their final cured form. The stable intermediate polyurethanes are storable or saleable for later use in processing and curing to elastomers, films, textile finishes, adhesives, and other forms in which polyurethanes are commonly employed.

It is, accordingly, an objective of this invention to provide a synchronous method for making partially-blocked and curable polyurethanes requiring no prepolymers.

Another objective is to provide curable polyurethane intermediates capable of storage or sale for subsequent use in making protective and functional finishes, coatings, films, and the like.

Another objective is to provide cured polyurethane products having ranges of properties not achievable with prepolymer-based compositions.

DETAILED DESCRIPTION

This invention is a synchronous partial-blocking process for making oxime-blocked intermediate polyurethanes comprising mixing and reacting an organic polyisocyanate, an amount of an oxime equivalent to 5–35 percent of the isocyanate groups charged, a polyol, a catalyst, and optionally an inert solvent. The sum of the isocyanate-active hydrogens in the oxime and the polyol is at least substantially stoichiometrically equivalent to the isocyanate groups charged. After an optional but preferred initial period during which all of the oxime reacts spontaneously with its equivalent of isocyanate groups, the mixture is either heated or permitted to stand until all of the residual isocyanate groups have reacted with the polyol, which latter preferably remains in excess in the intermediate product at this point, available for a subsequent curing reaction.

It is thus preferable, but not essential, that the initial charge include sufficient polyol for its active hydrogens to be substantially stoichiometrically equivalent to the isocyanate groups charged. In such case the before-mentioned intermediate polyurethane will include chemically or be mixed physically with enough residual polyol-supplied hydroxyl groups to effect the later total cure of the intermediate polyurethane. Should less than this have been charged, however, an amount of further polyol required to raise the total polyol hydroxyl groups charged to equivalency with the isocyanate groups is added before curing. The final step in the process of the invention is to subject the precondensate mixture, with its balanced charge of original isocyanate groups and original and additional polyol, to a standard cure by heating in the range of 140°–200°C, optionally in the presence of additional catalyst, frequently more of the same one used in the first stage of the reaction. This cure displaces the oxime and converts the intermediate polyurethane to an unblocked cured polyurethane.

The products of the invention thus fall into two classes: first, storage-stable, oxime-blocked intermediate polyurethanes, preferably compounded with the proper amount of polyol for subsequent curing, and second, the cured polyurethanes made therefrom by heating at curing temperatures.

The process of the invention apparently primarily depends for its success upon the fact that the polyisocyanate and the oxime, either in the absence or the presence of the polyol, react with each other so fast that even at room temperature (e.g., 20°-25°C), all of the oxime is quickly expended in blocking an equivalent amount of isocyanate. Following this, in the presence of polyol, the rest of the isocyanate is converted to urethane on heating or standing. Despite the preferred presence of 1:1 stoichiometric quantities of polyols and polyisocyanates in the reaction mixture, which under normal conditions would lead to gelling, the intermediate polyurethanes of the invention surprisingly remain free of gelation. Since both diols and triols (the usual precursors for prepolymers) and higher order polyols (generally among the components of curing polyols) are preferably present from the beginning, the products are different from, and generally more complex and random in composition than are most prepolymer-derived intermediate and cured polyurethanes.

Expressed otherwise, by utilizing the teaching of this invention it is now possible to combine polyisocyanate, polyol or polyols, oxime blocking agent, catalyst, and preferably solvent in a single reaction mixture and heat or let stand until all the isocyanate groups have reacted, first with the blocking agent and then with polyol hydroxyl groups. It is apparently the high rate of reaction of the critical oxime blocking agent which makes the overall reaction process possible. The more commonly known phenolic blocking agents are not suitable in the process of this invention.

A less preferred form of the process of the invention, while not so convenient as charging all of the reactants at once, is to place the polyisocyanate and the oxime together first, preferably with diluent solvent to help control the heat of the reaction, and thereafter to add the polyol and its attendant catalyst.

Completely simultaneous addition of the reactant components is in any case not usually feasible. Because of the spontaneously exothermic nature of the isocyanate-oxime reaction, it is believed preferable, for maximum control over the thermal effects and the course of the reaction, to add polyisocyanate, polyol, and optional diluent before adding the oxime. The point of addition of the catalyst seems to make no perceptible difference, but instances may occur where delayed addition of part of the catalyst may appear advantageous to one skilled in the art, without departing from the spirit and scope of the invention.

Any suitable oxime is effective, among these being acetone oxime, acetaldoxime, butanone oxime, cyclohexanone oxime, and the like.

An oxime based on a relatively volatile aldehyde or ketone is believed to be preferred. The most preferred oxime is butanone oxime, also commonly known as methyl ethyl ketoxime. Mixtures of oximes may be used, but there is no known merit in so doing. The proportions of oxime utilized may range from about 5 to 35 percent of equivalence to the isocyanate groups present. A more preferred range is 10–25 percent. Lower amounts of oxime than these produce intermediate polyurethanes of excessive viscosity, while higher amounts yield excessively fluid intermediates which additionally are difficult to emulsify, when such emulsification is desirable, and are slow in curing.

The polyisocyanate may be any of the large number of isocyanates commonly employed in polyurethane technology, among these being aliphatic and cycloaliphatic diisocyanates such as hexamethylene diisocyanate, trimethylhexamethylenediisocyanate, isophorone diisocyanate, 4,4'-methylenedicyclohexyl diisocyanate, and others; aromatic diisocyanates such as tolylene diisocyanate and 4,4'-methylenediphenyl diisocyanate; and higher polyisocyanates such as the triisocyanate Desmodur N, $(OCN(CH_2)_6NHCO)_2N(CH_2)_6NCO$, made by Mobay Chemical Company. In general, single diisocyanates, including commercially available isomeric mixtures, are preferred, although one skilled in the art may readily achieve special properties by utilizing mixtures of more than one polyisocyanate.

The polyols useful in the invention are extremely varied, mixtures of more than one polyol being generally preferred for a wider range of desirable properties. The widely used polyetherdiols such as those made by reaction of ethylene oxide and/or propylene oxide with glycols, the polyesterdiols made from glycols and dibasic acids or from lactones, and more complex polyesterpolyols made by reaction of mixtures of simple diols and triols with dibasic acids, are among the useful polyols. These polymeric polyols, as is well known in the art, are largely responsible for the flexibility and certain other desirable properties of the final polyurethanes. Mixtures of polyols including limited proportions of triols and higher polyols, such as ethoxylated trimethylolpropane, are particularly desirable as means for providing enhanced final curing properties. In general, diol:triol molar ratios of about 1:1 to 13:1 are preferred. Although the aforementioned classes of polymeric polyols are generally the most useful in the process of this invention, simple polyols such as ethylene glycol, 1,4-butanediol, 1,6-hexanediol, trimethylolpropane, and pentaerythritol, either alone or in conjunction with polymeric polyols, may also be used effectively. In particular, varying amounts of these lower polyols may be used as modifiers to increase hardness and modulus in compositions based primarily on the polymeric polyols. Some typical effective polyol mixtures are shown in the examples which follow.

The catalysts suitable for both the intermediate and curing stages of the process of the invention include many of those commonly used in the art, among these being tin and lead compounds for the intermediate stage and tin, lead, copper, and zinc compounds for the curing stage. Typical intermediate catalysts are stannous octoate, lead octoate, and dibutyltin diacetate; and typical curing catalysts, generally used in larger amounts, are zinc octoate, cupric acetate, zinc acetate, and lead octoate. Dibutyltin dilaurate has been found particularly effective as a catalyst for both the intermediate and the curing stages. As noted before, the times of addition of the catalyst or catalysts are not critical, but it is generally advisable to withhold the curing catalyst, if it is to be added at all, until the time for curing is reached. The optional heating for speeding formation of the intermediate polyurethane is preferably in the range of 60°–110°C, while curing is usually in the range of 140°–200°C, catalysts serving primarily as a means for speeding the cure.

The use of an inert diluent or solvent is optional, though generally some degree of dilution seems preferable for optimum control and flexibility of reaction. Xylene is among the solvents of choice when it is needed. Particularly when hydrophilic polymers such as the polyetherdiols are used, it may be desirable to avoid the use of solvent as a means of helping to reduce contamination with water during the period of reaction. It is generally desirable to employ anhydrous conditions so long as any isocyanate groups remain unreacted or unblocked. There may, however, well be times when one skilled in the art may elect to utilize even a water-soluble solvent during the reaction.

The synchronous method is herein compared with known prepolymer, also defined as sequential, methods. These latter derive their identity from the fact that they utilize polyurethane prepolymers and follow a sequential order of discrete synthesis steps: formation of prepolymer, partial blocking of same, reaction of blocked prepolymer with polyol, and, finally, curing. In the synchronous process of this invention, no prepolymer is made, and the three steps prior to curing are preferably combined into one.

The process of this invention has the following advantages:

1. The processing time for the preparation of the partially-blocked intermediate polyurethane is considerably reduced by comparison with the time required to make and react prior-art prepolymers.

2. The viscosity of the partially-blocked intermediate polyurethane is unexpectedly reduced, as well as being much more readily controlled than is a prepolymer-based intermediate, wherein the prepolymer itself sets lower limits on the possible viscosity. In effect, the oxime serves not only as a blocking agent but as an effective chain terminator. At the same time, whenever more viscosity is desired, this is easily achieved by suitable reductions in the amount of blocking, i.e., chain terminating, oxime present.

3. The order of reaction, wherein chain termination precedes and thereby prevents excessive polymerization in the pre-cure stages, makes it possible to use significantly reduced amounts of blocking agent, which lesser amounts of blocking agent are readily displaced in the curing step to which the precondensate is ultimately to be exposed.

Just as in many other blocked isocyanate systems, the intermediate polyurethanes of this invention are free of active isocyanate groups and therefore can be subjected to treatments such as emulsification or solution in water, without harming in any way the inherent curing potential of said intermediates. The products, which are thus easily stored or shipped in their solvent-free, dissolved, or emulsified form, have essentially unlimited shelf lives.

The process of this invention, and the products made thereby, may be varied by the inclusion, at whatever stages of the process are most suitable, of additives such as pigments, fillers, antioxidants, flame retardants, plasticizers, surfactants, dyes, and the like.

Further details of the invention will be found in the examples which follow.

EXAMPLE 1

The two polyether polyols, NIAX Polyols PPG–20–25–ONE and LHT–240–ONE, used in this preparation are produced by Union Carbide Corporation. PPG–20–25–ONE is a linear polypropylene glycol with a molecular weight of 2010. LHT–240–ONE is a propoxylated glycerol of molecular weight 723. PPG–2025–ONE (422.2 g, 0.21 mole) LHT–240–ONE (21.7g, 0.03 mole), xylene (333.7 g) and isophorone diisocyanate (IPDI, 56.6 g, 0.255 mole) were charged to a reaction kettle. Butanone oxime (8.5 g, 0.1 mole) was added to the flask with good agitation. A small exotherm was noted, indicating reaction of the oxime with diisocyanate. Dibutyltin dilaurate catalyst (5.5 g of a 1 percent solution in xylene) was added, followed by immediate heating to 100°C. After 2.5 hours, no isocyanate remained unreacted. The colorless solution was completely mobile and had a viscosity of 200 cps at 30°C.

EXAMPLE 2

Carbowax 1540 (a linear polyethylene glycol produced by Union Carbide Corporation, molecular weight 1365) and Ethosperse G–26 (a triol prepared by ethoxylation of glycerol, Glyco Chemical Company, molecular weight 1210) were charged to the reactor at room temperature. The amount of Carbowax 1540 used was 286.6 g (0.21 mole), while the amount of Ethosperse G–26 was 36.3 g (0.03 mole). 1,2-Dimethoxyethane (solvent, 252.6 g) and trimethylhexamethylene diisocyanate (TMDI) (53.5 g, 0.51 mole) were then charged to the reactor. The above charge resulted in a diol:triol molar ratio of 7:1 and an NCO:OH ratio of 1:1. Butanone oxime (8.5 g, 0.1 mole) was charged to the reactor using good agitation. An exotherm of 3° was immediately noted. Stirring was continued for 30 minutes whereupon 4.0 g of a 1 percent solution of dibutyltin dilaurate catalyst in xylene was added to the reaction mixture. The resulting mixture was heated to 100°C for 3 hours, giving a product free of isocyanate. This finished product was completely miscible with water in all proportions. Films of the product, with added zinc octoate catalyst, were thermally cured to crosslinked films readily swollen by water.

These first two examples, utilizing polyether polyols and diol:triol ratios of 7:1, showed no differences attributable to immediate versus delayed heating after addition of oxime. Blocking was about 20 percent in Example 1, 10 percent in Example 2.

EXAMPLE 3

The experimental polyester polyol used in this example was prepared by condensing adipic acid, diethylene glycol, and trimethylolpropane and had a hydroxyl number of 59.4 eq. wt. 944.4). NIAX Polyol PCP–0310 is a polyester triol derived from reaction of a triol with caprolactone and has a molecular weight of 895. TDI is the commercially available 80:20 mixture of 2,4- and 2,6-tolylene diisocyanate. DBTDL is an abbreviation for dibutyltin dilaurate.

The following were charged in order to a polymer kettle:

| | |
|---|---|
| Experimental polyol | 472.2 g (0.5 eq) |
| NIAX Polyol PCP-0310 | 148.9 g (0.5 eq) |
| Xylene | 477.1 g |
| TDI | 87.1 g (1.0 eq) |
| Butanone oxime | 16.5 g (0.19 eq) |
| DBTDL | 2.4 g (10% solution in xylene) |

After addition of the oxime the temperature rose 7°C. The mixture was heated to 80°C for two hours, at which time no unreacted isocyanate could be found by infrared analysis (4.4μ). The Brookfield viscosity (speed 6, spindle 3) was 14,200 cps at 30.0°C. This example showed a successful run at 20 percent blocking using an aromatic diisocyanate.

EXAMPLE 4

One equivalent of a polyester polyol prepared by condensing adipic acid, 1,6-hexanediol, and trimethylol propane (hydroxyl number = 154, equivalent weight = 364), was charged at room temperature to a reactor along with xylene (324.3 g) and trimethylhexamethylene diisocyanate (TMDI, 105.0 g). The ratio of isocyanate equivalents to equivalents of hydroxyl groups was 1:1. Analysis for percentage isocyanate at this point indicated the presence of 5.15 percent (theory 5.18 percent) isocyanate. With continuous stirring, butanone oxime (17.4 g, 0.2 equivalent) was charged rapidly to the reactor. An immediate reaction ensued as evidenced by a temperature rise of 3°–4°C. Agitation was continued for approximately one-half hour at which point analysis of the reaction mixture showed 4.12 percent isocyanate. Reaction of all of the oxime with isocyanate gave a calculated (theory) concentration of isocyanate at 4.14 percent. Dibutyltin dilaurate catalyst (0.91 g of a 5 percent solution in xylene) was added to the reaction mixture. The reactor was heated to 100°C and held at this temperature for 3.5 hours until no isocyanate remained in the reaction mixture. A film cast on a glass plate and cured for 30 minutes at 160°C gave a crosslinked, colorless film having elastomeric properties.

EXAMPLE 5

The following runs were made to determine the minimum percentage blocking possible using only a trifunctional polyol. The triol used was NIAX Polyol PCP-0310, described in Example 3. The initial charges of diisocyanate, polyol, solvent and catalyst were identical in both runs, while the amount of butanone oxime blocking agent was varied to achieve the desired percentage blocking.

| | | | |
|---|---|---|---|
| Initial Charge: | TMDI | 26.2 g (0.25 eq.) | |
| | PCP-0310 | 74.6 g (0.25 eq.) | |
| | DBTDL | 3.0 g (1% solution in xylene) | |
| | Xylene | 100.0 g | |
| | | Run A | Run B |
| | | (20% Blocked) | (22.5% Blocked) |
| Weight of butanone oxime | | 4.35 g (0.05 eq.) | 4.9 g (0.0562 eq.) |

Run A gelled overnight after previously being heated at 60°C in an oven for about 3 hours. The crosslinked product was insoluble in N,N-dimethyl formamide. Run B remained completely mobile after heating at 60°C and then standing at room temperature. Analysis of Run B showed no unreacted isocyanate. Films of Run B were cast and cured as in Example 4. The cured films were insoluble in N,N-dimethyl formamide, tetrahydrofuran, and m-cresol.

EXAMPLE 6

This example utilizes a polyester polyol system and 9.5 percent blocking. The experimental and the NIAX polyols are described in Example 3. The following materials were charged to a reaction flask at room temperature with agitation.

| | |
|---|---|
| Experimental Polyol | 472.2 g (0.5 eq.) |
| NIAX Polyol PCP-0310 | 148.9 g (0.5 eq.) |
| Xylene | 487.8 g |
| TMDI | 105.0 g (1.0 eq.) |
| Butanone Oxime | 8.3 g (0.095 eq.) |
| DBTDL | 2.45 g of a 10% solution in Xylene |

The reaction mixture became extremely viscous after heating at 100°C for two hours. Tetrahydrofuran (611.4 g) was added to reduce the viscosity of the product. The viscosity (Brookfield) of the diluted product was >100,000 cps.

EXAMPLE 7

In this example NIAX D–560, a polyesterdiol produced from a diol and caprolactone and having a molecular weight of about 2000, and NIAX PCP–0300, a polyestertriol produced from a triol and caprolactone with a molecular weight of about 545, both made by Union Carbide Corporation, were used at a 30 percent blocking level and a diol:triol molar ratio of 13:1. The following materials were charged to a reaction kettle at room temperature with agitation.

| | |
|---|---|
| NIAX Polyol D-560 | 259.1 g (0.26 eq.) |
| NIAX Polyol PCP-0300 | 5.4 g (0.03 eq.) |
| Xylene | 196.6 g |
| TMDI | 30.45 g (0.29 eq.) |
| Butanone Oxime | 7.58 g (0.087 eq.) |
| DBTDL | 1.3 g of a 10% solution in xylene |

After the above materials were charged, an exotherm of 4–5°C was noted. The total stirring time prior to heat-up was 30 minutes. After 2.5 hours of heating at 100°C, no unreacted isocyanate remained in the reaction mixture.

EXAMPLE 8

In this example NIAX Polyol D–560 diol and NIAX Polyol PCP–0300 triol of Example 7 were used in conjunction with acetone oxime at a diol:triol molar ratio of 1.23:1. The following reactants were charged at room temperature with stirring:

| | |
|---|---|
| NIAX Polyol PCP-0300 | 116.04 g (0.639 eq.) |
| NIAX Polyol D-560 | 518.12 g (0.52 eq.) |
| IPDI | 128.86 g (1.16 eq.) |
| Xylene | 521.3 g |
| Acetone Oxime | 16.9 g (0.232 eq.) |
| DBTDL | 1.8 g of a 10% solution in xylene |

After all the reactants were charged, stirring was continued for 30 minutes at room temperature. At this point, the reaction temperature was raised to 100°C and maintained at that temperature until all of the isocyanate had reacted, about 2.5 hours. No detectable difference was observed in the reactions of acetone and butanone oximes.

EXAMPLE 9

In this example the rate of reaction of butanone oxime with trimethylhexamethylene diisocyanate (TMDI) was evaluated at room temperature. TMDI (105.0 g, 1.0 eq.) and 315.0 g xylene were placed in a reaction flask under dry nitrogen, and a solution of 33.1 g (0.38 eq.) of butanone oxime in 99.3 g of xylene was added rapidly. The temperature rose to 42°C in 10–12 minutes. The extent of reaction of the oxime with TMDI was measured at intervals by analysis for unreacted isocyanate. The calculated isocyanate charged was 7.60 percent and its calculated content at complete reaction was 4.56 percent. Actual analysis were 4.85 percent at 5 minutes, 4.63 percent at 10 minutes, and 4.59 percent at 15 minutes. Obviously, the reaction was virtually complete within a few minutes.

EXAMPLE 10

In this example the rate of uncatalyzed reaction of the experimental polyester polyol of Example 3 with diisocyanate was evaluated. The polyol (236.1 g, 0.25 eq.) and xylene (201.0 g.) were charged to a reaction flask at room temperature. Hylene W (trade name of E. I. duPont de Nemours, Inc. for 4,4'-diisocyanatocyclohexyl methane), 65.6 g (0.5 eq.) was added to the flask in one portion with stirring. At selected time intervals, samples were withdrawn from the flask and analyzed for percentage unreacted isocyanate. The following results were observed.

| Time (hours) | % Isocyanate |
|---|---|
| 0 | 4.18% (theory) |
| 1 | 4.20 |
| 2 | 4.16 |

Reaction of all the polyester polyol with Hylene W would leave 2.09 percent isocyanate. Obviously the rate of reaction was much lower than that observed in Example 9, between diisocyanate and oxime.

EXAMPLE 11

The results of Example 10 lwere confirmed with a different diisocyanate, trimethylhexamethylene diisocyanate. The experimental polyester polyol of Example 3 (472.2 g, 0.5 eq.) and xylene (384.8 g) were charged to a reaction flask at room temperature. TMDI (105.0 g., 1.0 eq.) was then charged to the flask in one portion with stirring. At selected time intervals, samples were taken of the reaction mixture and analyzed for percentage unreacted isocyanate. The following results were observed.

| Time (hours) | % Isocyanate |
|---|---|
| 0 | 4.36 (theory) |
| 1 | 4.26 |
| 2 | 4.23 |
| 4 | 4.22 |

Once again there was almost no reaction, after as much as 4 hours. Reaction of all the polyol with TMDI would leave 2.18 percent isocyanate unreacted.

EXAMPLE 12

The results of Example 11 were confirmed using TMDI and the NIAX Polyol PCP-0310 polyester triol of Example 3. The polyol (149.2 g., 0.5 eq.) and xylene (169.4 g) were charged to a reaction flask at room temperature. TMDI (105.0 g, 1.0 eq.) was added to the flask in one portion with stirring. At selected time intervals, samples were withdrawn from the flask and analyzed for percentage unreacted isocyanate. The following results were observed.

| Time (hours) | % Isocyanate |
|---|---|
| 0 | 9.91 (theory) |
| 2 | 9.81 |
| 4 | 9.60 |

Again almost no reaction was observed. Reaction of all the PCP-0310 with the TMDI would leave 4.96 percent isocyanate.

EXAMPLE 13

In this example the inability of epsilon-caprolactam to substitute for oximes as a blocking agent in the systems of this invention was demonstrated. The reactants and their proportions were comparable to those of Example 3.

The following reactants described in Example 3 were charged to a polymer kettle.

| | |
|---|---|
| Experimental polyol | 236.1 g (0.25 eq.) |
| NIAX Polyol PCP-0310 | 74.6 g (0.25 eq.) |
| TMDI | 52.5 g (0.50 eq.) |
| Xylene | 248.4 g |
| DBTDL Catalyst | 1.2 g (10% solution in xylene |
| Epsilon-caprolactam | 11.2 g (0.10 eq.) |

The reaction mixture was heated to 100°C. After approximately 2 hours at this temperature, the reaction mixture gelled and could no longer be stirred. The crosslinked rubbery product was insoluble in N,N-dimethyl formamide.

EXAMPLE 14

As with caprolactam in Example 13, phenol was found in this example to fail in this invention as a blocking agent. The following reactants, described in Example 3, were charged to a polymer kettle.

| | |
|---|---|
| Experimental polyol | 236.1 g (0.25 eq.) |
| NIAX Polyol PCP-0310 | 74.2 g (0.25 eq.) |
| TMDI | 52.5 g (0.50 eq.) |
| Xylene | 247.7 g |
| Phenol | 9.2 g (0.10 eq.) |

The reaction mixture was heated with stirring to 80°C whereupon dibutyltin dilaurate catalyst (1.2 g of a 10 percent solution in xylene) was added to the reaction mixture. The temperature was raised to and held at 100°C. After approximately 3 hours, the reaction mixture gelled and could no longer be stirred. The crosslinked rubbery product was insoluble in N,N-dimethyl formamide.

EXAMPLE 15

In this example the experimental polyol and NIAX Polyol PCP-0310 described in Example 3 were used in conjunction with acetaldoxime. The following reactants were charged at room temperature with stirring:

| | |
|---|---|
| Experimental Polyol | 236.1 g (0.25 eq.) |
| NIAX Polyol PCP-0310 | 74.6 g (0.25 eq.) |
| TMDI | 52.5 g (0.50 eq.) |
| Xylene | 244.8 g |
| Acetaldoxime | 5.9 g (0.1 eq.) |
| DBTDL | 1.2 g of a 10% solution in xylene |

After all the reactants were charged, stirring was continued for 30 minutes at room temperature. During this period, a 4°C exotherm was noted. At this point, the reaction temperature was raised to 100°C and maintained at that temperature until all of the isocyanate had reacted, about 3 hours. The viscosity of the completed product was 4820 centipoise at 30°C. The product cured well and seemed to be essentially identical to comparable preparations using butanone oxime.

EXAMPLE 16

This example shows that the invention can be carried out at ambient temperature. 4,4'-Diisocyanatocyclohexylmethane, Hylene W, was used in conjunction with the experimental polyol of Example 3 and NIAX Polyol PCP-0301. The latter polyol is a polyester triol derived from reaction of a triol with caprolactone and has a molecular weight of 302. The following materials were charged to a quart jar at room temperature.

| | |
|---|---|
| Experimental Polyol | 236.1 g (0.25 eq.) |
| NIAX Polyol PCP-0301 | 25.1 g (0.25 eq.) |
| Xylene | 224.7 g |
| Hylene W | 65.6 g (0.5 eq.) |
| DBTDL | 1.0 g |
| Butanone Oxime | 8.7 g (0.1 eq.) |

Before the oxime was added, the reactants were stirred briefly. Addition of the oxime with stirring caused an exotherm of about 3°-4°C. The jar was capped loosely and allowed to stand undisturbed at room temperature (about 28°-9°C). After 23 hours only 0.13 percent unreacted isocyanate remained. After 47 hours, all of the isocyanate had reacted. The Brookfield viscosity of the product was 4280 centipoises at 30°C. No differences could be observed between this material and the same system prepared with the procedure involving heating at 100°C until the reaction was completed.

EXAMPLE 17

The following reactants were charged to a polymer kettle in order.

| | |
|---|---|
| 1,4-Butanediol | 56.0 g (1.4 eq.) |
| Trimethylolpropane | 13.4 g (0.3 eq.) |
| IPDI | 188.0 g (1.7 eq.) |
| 1,2-Dimethoxyethane | 192.4 g |
| DBTDL | 0.8 g (1% solution in xylene) |
| Butanone oxime | 29.6 g (0.34 eq.) |

After 30 minutes of stirring at room temperature, an isocyanate determination showed the presence of 11.4 percent isocyanate (11.9 percent theory). The reaction mixture was heated at about 80°C for 24 hours. At this point, no isocyanate remained unreacted. Hard tough films, insoluble in DMF, were prepared on glass plates by curing the product for 6–8 minutes at 325°F in the presence of 0.5 percent (by weight) DBTDL.

In light of the complexity of the systems of this invention, it is apparent that many other variations in reactants and conditions beyond those cited herein can be effected, without departing from the teaching of this invention. Accordingly, the scope of the invention is defined in the following claims wherein:

I claim:

1. A synchronous partial-blocking process for making an oxime-blocked intermediate polyurethane comprising the steps of
   a. preparing a pre-polymer-free reaction mixture by mixing with an unblocked organic polyisocyanate an amount of an oxime equivalent to 5–35 percent of the isocyanate groups, at least one polyol in an amount such that the sum of the isocyanate-active hydrogens in the polyol and the oxime is at least substantially equivalent to said isocyanate groups and a catalyst and
   b. allowing the polyisocyanate to react with the oxime and polyol in said mixture, the oxime blocking its equivalent of the isocyanate groups, and the polyol reacting with the residual isocyanate groups to form said oxime-blocked intermediate polyurethane.

2. The process of claim 1 wherein the amount of polyol is itself substantially equivalent to the isocyanate groups present, and the process includes the further step (d) of heating at curing temperature, to displace the oxime and convert said intermediate polyurethane to an unblocked cured polyurethane.

3. A process according to claim 2 including the step of applying said intermediate polyurethane to a fabric before said step of heating to a curing temperature.

4. The product of claim 3.

5. The product of claim 1.

6. A synchronous partial-blocking process for making an oxime-blocked intermediate polyurethane comprising the steps of
   a. preparing a pre-polymer-free reaction mixture by mixing with an unblocked organic polyisocyanate an amount of an oxime equivalent to 10-25 percent of the isocyanate groups, at least one polyol in an amount such that the hydroxyl groups in the polyol are substantially equivalent to said isocyanate groups and a catalyst, and b. allowing the polyisocyanate, oxime and polyol in said mixture to react.

7. The process of claim 6 including the further step of heating at curing temperature to displace said oxime and convert said intermediate polyurethane to an unblocked cured polyurethane.

8. The process of claim 7 wherein the further heating is carried out at a temperature of 140°–200°C in the presence of a curing catalyst.

9. The process of claim 6 wherein said polyol comprises a diol:triol mixture in a molar ratio of about 1:1 to 13:1.

10. The process of claim 9 wherein said oxime is butanone oxime.

11. The process of claim 6 wherein the reaction mixture includes an inert organic solvent.

12. The process of claim 6 wherein reaction is carried out at room temperature.

13. The process of claim 6 wherein the oxime is selected from the group consisting of butanone oxime, cyclohexanone oxime, acetone oxime and acetaldoxime and the polyol is a polymeric polyol or mixture thereof.

14. A partial-blocking process for making an oxime-blocked intermediate polyurethane comprising the steps of a. preparing a pre-polymer-free reaction mixture by mixing with an unblocked organic polyisocyanate an amount of an oxime equivalent to 5–35 percent of the isocyanate groups, at least one polyol in an amount such that the sum of the isocyanate-active hydrogens in the polyol and the oxime is at least substantially equivalent to said isocyanate groups and a catalyst and b. allowing the polyisocyanate to react with the oxime and polyol in said mixture, the oxime blocking its equivalent of the isocyanate group, and the polyol reacting with the residual isocyanate groups to form said oxime-blocked intermediate polyurethane.

15. The process of claim 14 wherein the isocyanate and oxime mixed together first before addition of the polyol.

16. The process of claim 15 including the further step of heating at curing temperature to displace the oxime and convert said intermediate polyurethane to an unblocked cured polyurethane.

17. The product obtained by preparing a prepolymer-free reaction mixture by mixing an unblocked organic polyisocyanate, an amount of an oxime equivalent to 5–35 percent of the isocyanate groups, at least one diol and at least one higher polyol in an amount such that the sum of the isocyanate-active hydrogens in the polyols and the oxime is at least substantially equivalent to said isocyanate groups and the amounts of polyols are themselves substantially equivalent to the isocyanate groups present, and a catalyst, said mixing being such that the oxime is mixed with the isocyanate prior to the reaction of the isocyanate and the polyols and heating at a curing temperature to displace the oxime and convert said intermediate polyurethane to an unblocked cured polyurethane.

18. The product of claim 17 wherein the amount of oxime is equivalent to 10–25 percent of the isocyanate groups.

19. A product obtained by the process of claim 17 including the further step of applying said intermediate polyurethane to a fabric before said step of heating to a curing temperature.

* * * * *

UNITED STATES PATENT OFFICE
CERTIFICATE OF CORRECTION

Patent No. 3,846,378     Dated November 5, 1974

Inventor(s) Azel A. Griswold

It is certified that error appears in the above-identified patent and that said Letters Patent are hereby corrected as shown below:

IN THE ABSTRACT

Line 10, after "film" insert --,--.

IN THE SPECIFICATION

Col. 1, line 36 change "1percent" to --percent--.

Col. 6, line 60 after "59.4" insert --(--.

Col. 9, line 28 change "analysis" to --analyses--.

Col. 9, line 60 change "1were" to --were--.

Col. 10, line 55 change "11.2" to --11.3--.

IN THE CLAIMS

Claim 15, line 2 after "oxime" insert --are--.

Signed and sealed this 6th day of May 1975.

(SEAL)
Attest:

RUTH C. MASON
Attesting Officer

C. MARSHALL DANN
Commissioner of Patents
and Trademarks